United States Patent [19]

Schmid et al.

[11] Patent Number: 4,832,868

[45] Date of Patent: May 23, 1989

[54] LIQUID SURFACTANT MIXTURES

[75] Inventors: Karl H. Schmid, Mettmann; Alfred Meffert, Monheim; Fritz Lange, Baderweg, all of Fed. Rep. of Germany

[73] Assignee: Henkel Kommanditgesellschaft auf Aktien, Duesseldorf, Fed. Rep. of Germany

[21] Appl. No.: 21,386

[22] Filed: Mar. 3, 1987

[30] Foreign Application Priority Data

Mar. 5, 1986 [DE] Fed. Rep. of Germany ....... 3607193

[51] Int. Cl.$^4$ ..................... B01F 17/30; B01F 17/16; B01F 17/00
[52] U.S. Cl. .................... 252/356; 252/351; 252/357; 252/174.19; 252/174.21; 252/174.22; 252/548; 252/DIG. 1; 252/DIG. 14
[58] Field of Search ........... 252/351, 357, 356, 174.21, 252/174.22, 548, DIG. 1, 174.19, DIG. 14

[56] References Cited

U.S. PATENT DOCUMENTS

| | | | |
|---|---|---|---|
| 4,075,118 | 2/1978 | Gault et al. | 252/DIG. 14 |
| 4,115,457 | 9/1978 | Widermann | 252/351 |
| 4,142,999 | 3/1979 | Bloching et al. | 252/DIG. 12 |
| 4,299,994 | 11/1981 | Stahel | 252/351 |
| 4,313,847 | 2/1982 | Chasin et al. | 252/356 |
| 4,474,678 | 10/1984 | Lutz et al. | 252/174.21 |
| 4,608,189 | 8/1986 | Koch et al. | 252/174.22 |

*Primary Examiner*—Paul Lieberman
*Assistant Examiner*—Christine A. Skane
*Attorney, Agent, or Firm*—Ernest G. Szoke; Wayne C. Jaeschke; Real J. Grandmaison

[57] ABSTRACT

A highly effective surfactant mixture which is liquid at room temperature comprising:

(1) from 50 to 84° C. by weight ether alcohol corresponding to the general formula $$R_1-O-[PO]_{0-3}[EO]_{6-8}H,$$

(2) from 10 to 40% by weight ether alcohol corresponding to the formula $$R_2-O-[PO]_{0-3}[EO]_{3-6}H,$$

(3) from 0 to 10% by weight ethoxylation products of polyols which may be obtained by reaction of $C_{12}-C_{18}$ 1,2-epoxides with ethylene glycol, glycerol, trimethylol propane or neopentyl glycol, (4) from 0.1 to 10% by weith of an amino alcohol selected from (A)

$$R_3-[EO]_{0-4}N(CH_2CH_2OH)_2,$$

or $$R_3-[EO]_{0-4}NH-CH_2CHOH$$

(B) the reaction product of $C_{12}-C_{18}$ 1,2-epoxide with mono- or diethanolamine, (C) reaction product of epoxidized oleyl or linoleyl alcohol with mono- or diethanolamine or (D) reaction product of compound (A), (B) or (C) with from 2 to 12 times the molar quantity of ethylene oxide, and (5) lower carboxylic acids in the quantity required to adjust a 1% aqueous solution to a neutral pH-value; wherein $R_1$ is a $C_9-C_{11}$ alkyl group, $R_2$ is a $C_{12}-C_{15}$ alkyl group, $R_3$ is a $C_{12}-C_{18}$ alkyl or alkenyl group, (EO) are ring-opened ethylene oxide residues and (PO) are ring-opened propylene oxide residues.

7 Claims, No Drawings

LIQUID SURFACTANT MIXTURES

BACKGROUND OF THE INVENTION

1. Field of the Invention

This invention relates to surfactant mixtures which are liquid at room temperature, and more particularly, to such mixtures based on polyalkoxylated alcohols having high surfactant power comprising straight-chain and/or branched-chain ether alcohols.

2. Discussion of Related Art

The alkylphenol ethoxylates now being widely used as nonionic surfactant components show considerably better low-temperature behavior, e.g., lower pour points and low-temperature cloud points, than comparable ethoxylates based on linear fatty alcohols. Among the alkylphenol ethoxylates, the nonylphenol-10 moles ethylene oxide adduct (NP-10) in particular is distinguished by such outstanding performance properties that it may be universally used as a surfactant for detergents and cleaning preparations and also as an emulsifier for various industrial applications. In addition, this surfactant has very good degreasing properties both on metal and on fabrics. By virtue of these favorable properties, it is now by far the most significant representative in terms of quantity of the group of alkylphenol ethoxylates.

Unfortunately, these alkylpyhenol ethoxylates are attended by the disadvantage of questionable environmental compatibility, so that considerable efforts are being made at least partly to replace this technologically high-quality surfactant component by components showing better compatibility with the environment. This role could be filled in particular by alkoxylated fatty alcohols of natural and/or synthetic origin. However, their use involves the difficulty that ether alcohols of the type just mentioned only have the hydrophilicity values required in practice, i.e., cloud point for example in the range of from about 60° to 65° C., in those forms in which the ether alcohols are solid as such at room temperature. In practical terms, this represents a serious limitation in the attempt to replace the alkyl-phenol adducts by straight-chain and/or branched-chain fatty alcohol adducts.

An object of the present invention is to provide surfactant mixtures based on alkoxylated straight-chain and/or branched-chain alcohols, more especially corresponding fatty alcohols, which are still liquid at low temperatures, for example at temperatures down to about 10° C., but which nevertheless are capable of generating high surfactant power. More particularly, an object of this invention is to provide a surfactant mixture which is at least equivalent to the nonylphenol-10 moles ethylene oxide adduct in its important technological properties without the unwanted alkylphenol structure having to be introduced into this mixture. According to this invention, it is possible to combine surfactant mixtures which are equivalent to the nonylphenol-10 moles ethylene oxide adduct in virtually every property, but which nevertheless are synthesized solely from environmentally compatible components.

DESCRIPTION OF THE INVENTION

Other than in the operating examples, or where otherwise indicated, all numbers expressing quantities of ingredients or reaction conditions used herein are to be understood as modified in all instances by the term "about".

Acordingly, the present invention relates to surfactant mixtures which are liquid at room temperature based on poly-alkoxylated alcohols of high surfactant power which are characterized in that they comprise of the following components, (all weights being based on the total mixture of components (1) to (5)).

(1) from 50° to 84° C. by weight straight-chain and/or branched-chain ether alcohols corresponding to the general formula $$R_1-O-[PO]_{\overline{0-3}}[EO]_{\overline{6-8}}H \qquad (I)$$

wherein
 $R_1$ is a linear or branched $C_9$–$C_{11}$ alkyl group,
 PO is the residue of the ring-opened propylene oxide, and
 EO is the residue of the ring-opened ethylene oxide;

(2) from 10 to 40% by weight straight-chain and/or branched-chain ether alcohols corresponding to the following general formula $$R_2-O-[PO]_{\overline{0-3}}[EO]_{\overline{3-6}}H \qquad (II)$$

wherein
 $R_2$ is the linear or branched alkyl group of a fraction predominantly containing from 12 to 15 carbon atoms, and
 PO and EO are residues as defined in (1);

(3) from 0 to 10% by weight ether polyols from the reaction of ethylene oxide with polyol reactants in a molar ratio of ethylene oxide to polyol reactants of 6-15:1, the polyol reactants in turn having been produced by reaction of
 (a) ethylene glycol, glycerol, trimethyol propane and/or neopentyl glycol with
 (b) $C_{12}$–$C_{18}$-olefin epoxides and/or epoxidized oleyl or linoleyl alcohol in molar ratios of (a) to (b) of from 1:1 to 3:1;

(4) from 0.1 to 10% by weight substituted amino alcohols selected from the group consisting of
 (A) alkyl or alkyl ether mono- and/or diethanolamines corresponding to the following general formulae $$R_3-[EO]_{\overline{0-4}}N(CH_2CH_2OH)_2 \qquad (III)$$

$$R_3-[EO]_{\overline{0-4}}N-CH_2CH_2OH \qquad (IV)$$

wherein
 $R_3$ is a linear or branched $C_{12}$–$C_{18}$ alkyl or alkenyl group
 EO is the residue of the ring-opened ethylene oxide,
 (B) the reaction product of $C_{12}$–$C_{18}$-olefin epoxides and mono- or diethanolamine,
 (C) the reaction product of epoxidized oleyl or linoleyl alcohol with mono- or diethanolamine and/or
 (D) reaction products of the substituted amino alcohols of (A), (B) or (C) with ethylene oxide in molar ratios of from 2 to 12 moles ethylene oxide per mole of the substituted amino alcohol; and (5) lower carboxylic acids in such a quantity that the pH-value of a 1% by weight aqueous solution of the mixture as a whole is substantially in the neutral range.

The preferred quantitative ranges for components (1) to (5) in the surfactant mixtures are as follows:

Ether alcohols of general formula I: from 52 to 65% by weight;
Ether alcohols of general formula II: from 25 to 35% by weight;
Ether polyols as defined in (3): from 3 to 7% by weight;
Substituted amino alcohols as deined in (4) (A), (4) (B) and/or (4) (C): from 0.1 to 1% by weight;
Ethoxylated substituted amino alcohols according to (4) (D): from 3 to 7% by weight;
Lower organic acids according to (5): from 0.1 to 3% by weight.

The figures given above for the ratios by weight used show the following: the use of component (3), although not imperative, is preferred. The unethoxylated derivatives according to (4) (D) may be used in larger quantities, albeit within the general range indicated. Where substituted amino alcohols from the group (4) (A) to (C) are used, they are preferably used with the additional provision that polyol compounds according to (3) and/or ethoxylated amino alcohols according to (4) (D) are used at the same time.

The ether alcohols corresponding to general formula II, i.e. component (2), may be derived from straight-chain and/or branched alcohols represented by $R_2OH$ where the substituent $R_2$ contains from 8 to 18 carbon atoms. However, it is important in this regard that the $C_{12}$–$C_{15}$ fraction is at least predominantly represented. It may be preferable for at least about 75% by weight, and more especially at least 80% by weight or even more, for example at least about 90 or 95% by weight, of the corresponding alcohol fraction to be represented by the $C_{12}$–$C_{15}$ range.

Basically, components (1), (2) and (4) of the mixtures may be derived from corresponding alcohols of natural and/or synthetic origin. Alcohol cuts corresponding to the definition in accordance with the invention are available in many different forms as commercial products both of natural origin and of synthetic origin.

The following additional preference applies to the choice of components (1) and (2) of the surfactant mixtures. That is, although there is no need whatever for residues of the propylene oxide to be used in the ether alcohols corresponding to general formulae I an II, it is nevertheless best to use such residues of the Propylene oxide at least partly in component (1) and/or in component (2).

The lower carboxylic acids of component (5) are present as amine salts in the surfactant mixture according to the invention. Toxicologically safe lower carboxylic acids are preferably used, particular significance being attributed to acetic acid, glycolic acid, lactic acid and/or citric acid.

In another embodiment, the invention relates to the replacement of nonylphenol adducts containing 9 or 10 moles of ethylene oxide mixtures according to the invention with the components (1) to (5). The comparability of a broad property spectrum of nonylphenol-10 moles ethylene oxide adduct with the surfactant mixtures according to the invention is shown in the following with reference to "product A" according to the invention. This "product A" according to the invention is a surfactant mixture having the following composition:

(1) 58.5% $C_{10}$-$PO_{1.1}$-$EO_{6.5}$ (2) 11% $C_{12}$-$C_{14}$ (50:50)-$PO_{1.1}$-$EO_{6.5}$ 20% $C_{12}$-$C_{14}$ (70:30)-$PO_2$-$EO_{5.5}$ (3) 5% reaction product of $C_{12}$-$C_{14}$-$\alpha$-olefin epoxide with ethylene glycol onto which 10 moles ethylene oxide (EO) have been added (referred to in the following Examples as "product 1")

(4) 5% reaction product of $C_{12}$-$\alpha$-olefin epoxide with diethanolamine onto which 10 moles EO have been added (referred to in the following Examples as "product 2")

(5) 0.5% lactic acid.

The product properties were compared according to the following criteria:
pour point (DIN 51 583)
low-temperature cloud point (DIN 51 583)
immersion wetting power (DIN 53 901)
determination of surface tension (DIN 53 914)
cloud temperature 1% in deionized water) (DIN 53 917)
determination of cleaning power by Gardner's method (Seifen-Ole-Fette-Wachse 108, page 527 (1982))
determination of washing power
determination of emulsifying power
 (a) paraffin emulsion
 (b) emulsion containing mineral oil (for example for cooling lubricants)
determination of degreasing effect
 (a) on metal surfaces
 (b) on cotton

EXAMPLE 1

Comparative Studies

|  | NP-10* | Product A according to the invention |
|---|---|---|
| Low-temperature cloud point | 8–10° C. | 9–10° C. |
| Pour point | 6–8° C. | 6° C. |
| Immersion wetting power | 18 seconds | 18 seconds |
| Surface tension | 31 mN/m | 27 mN/m |
| Cloud temperature | 60–65° C. | 60–65° C. |
| 1% solution in water | pH 7 |  |

*Nonylphenol-10 moles ethylene oxide

Determination of washing power

Standard commercial detergent formulation in which 4.4% NP-10 is present and was replaced by product A.
Test conditions:
Standard commercial washing machine
Water: 16° dH (German hardness), 1-liquor method
Liquor: approximately 20 liters
Dosage: 6 g washing powder/liter
Temperature: 60° C.; Fabric: cotton/polyester

|  | NP-10 | Product A |
|---|---|---|
|  | (values = remission values in %) | |
| Soil |  |  |
| Dust/wool fat | 60 | 60 |
| Dust/sebum | 70 | 68 |
| Mineral Oil | 52 | 50 |
| Temperature: 40° C.; Fabric: cotton/polyester |  |  |
| Dust/wool fat | 46 | 60 |
| Dust/sebum | 62 | 61 |
| Mineral Oil | 48 | 46 |

Determination of degreasing effect on metal surfaces

The degreasing effect of product A was determined by comparison with NP-10. In this method, V2A-plates polished on one side are coated with mineral oil and immersed for 10 minutes in a 0.1% surfactant solution. During this period, the solution is pump-circulated at 2 liters per minute. The degreasing effect is determined by weighing out the metal plates before and after degreasing (after drying), the figures indicated then showing the precentage of fat which was removed from the metal surface by the surfactant solution.

Test conditions:
Water: 18° dH
Liquor: 6 liters
Temperature: 20° C.
Circulation volume: 2 liters per minute
Surfactant concentration: 0.1%
Test duration: 10 minutes
Mineral oil: "Ellmo SO 40" ® (a product of Eller Montan, D/üsseldorf)

| | Degreasing in % |
|---|---|
| Product A | 67 |
| NP-10 | 50 |

Determination of emulsifying power

1. Water-emulsifiable cooling lubricant
Test formulation:
5.0% petroleum sulfonate, calcium salt
1.2% NP-10 or product A
5.5% boric acid
8.5% fatty acid polydiethanolamide
3.2% tall oil fatty acid 25/30
1.0% propylene glycol, molecular weight 400
22.5% mineral oil
35.6% water
17.5% diethanolamine
A 5% aqueous emulsion of this concentrate is transparent and finely divided both with NP-10 and also with product A; water having a hardness of from 5° to 20° dH may be used.

Paraffin emulsion

Test formulation:
12.5% paraffin, thinly liquid
18.8% NP-10 or product A
6.2% $C_{16}$–$C_{18}$ (50:50)-6 moles EO
62.5% water
A finely divided, transparent microemulsion is obtained both with NP-10 and also with product A.

Determination of cleaning power

The cleaning effect of the surfactant mixture according to the invention was tested in accorance with the quality standards of the industrieverband Putzund pflegemittel (IPP), as published in Seifen-oleFette-Wachse, No. 108, p. 527 (1982), in direct comparison with NP-10.

| Formulation A | Formulation B |
|---|---|
| 8% alkylbenzene sulfonate, sodium salt | 8% cocosalcohol-2-EO—sulfate, sodium salt |
| 2% NP-10 or surfactant | 2% NP-10 or surfactant |
| 3% sodium gluconate | 3% sodium gluconate |
| 2% cumene sulfonate | 2% cumene sulfonate |
| 85% deionized water | 85% deionized water |

These two formulations were tested both undiluted and also in the form of 1% aqueous solutions. In addition, the pure surfactant was tested by comparison with NP-10. The results are set out in Table 1 below:

TABLE 1

| | Formulation A | | Formulation B | | Pure surfactant |
|---|---|---|---|---|---|
| | undiluted | 1% | undiluted | 1% | 10% in water |
| NP-10 (for comparison) | 100 | 100 | 100 | 100 | 100 |
| Cocosalcohol + 10 EO (for comparison) | 100 | 90 | 80 | 100 | 70 |
| Surfactant "product A" (according to the invention) | 100 | 100 | 100 | 100 | 100 |

The figures signify relative cleaning results in %, the cleaning power of NP-10 being 100%

| Thickening point Consistency at 20° C. Parts by weight | Product A | NP-10 |
|---|---|---|
| Surfactant:Water 0° dH | | |
| 90:10 | liquid, clear | liquid, clear |
| 80:20 | liquid, clear | liquid, clear |
| 70:30 | liquid, clear | viscous liquid |
| 60:40 | liquid, clear | highly viscous liquid |
| 50:50 | highly viscous paste | highly viscous paste |
| 40:60 | viscous liquid | viscous paste |
| 30:70 | liquid, clear | liquid, clear |
| 20:80 | liquid, clear | liquid, clear |

Degreasing washing effect (% residual fat)—Textil-Technik

| | Product A | NP-10 |
|---|---|---|
| Petroleum ether extraction Neutral | 0.25 | 0.5 |
| Alkaline (2 g/l soda) Unwashed material 3.7 Carpet yarn count 1.8/1 Lubricant mineral oil | 0.30 | 0.4 |

Simulated continuous washing

| Bath 1 | + 2 l/g surfactant | 90 secs. 50° C. |
|---|---|---|
| 3 | rinse | 90 secs. 35° C. |
| 4 | rinse | 90 secs. 20° C. |

Foaming power

Test apparatus Krantz dyeing apparatus
Surfactant concentration: 1 g/l
Neutral
Heating-up phase Bath circulation: setting Visual assessment 0 = no foaming power
100 = intensive foaming power

|  | 30° C. | 60° C. | 90° C. |
|---|---|---|---|
| Product A | 90 | 90 | 20 |
| NP-10 | 90 | 90 | 20 |

Examples 2 to 7 below describe further surfactant compositions according to the invention. The test results of these mixtures are shown in Table 2.

EXAMPLE 2

50.0% $C_{10}$-2PO-7EO
49.4% $C_{12}/C_{14}$ (70:30)-2PO-5.5EO
5.0% reaction product of $C_{12}/C_{14}$-α-olefin epoxide with ethylene glycol onto which 10 moles EO have been added (product 1)
5.0% product 2
0.6% lactic acid (90%)
PO = propylene oxide; EO = ethylene oxide

EXAMPLE 3

79.2% $C_{10}$-2PO-7EO
10.0% $C_{12}/C_{14}$(70:30)-2PO-5.5EO
10.0% product 2
0.8% lactic acid (90%)

EXAMPLE 4

79.2% $C_{10}$-2PO-7EO
10.0% $C_{12}/C_{14}$(70:30)-2PO-5.5EO
3.0% product 1
7.0% $C_{12}/C_{14}$-fatty amine+12EO
0.8% lactic acid (90%)

EXAMPLE 5

68.6% $C_{10}$-1.2PO-5EO
20.0% $C_{12}/C_{14}$(70:30)-2PO-5.5EO
3.0% reaction product of $C_{12}/C_{14}$-α-olefin epoxide with ethylene glycol onto which first 1.2 moles PO and then 8 moles EO have been added.
7.0% reaction product of $C_{12}$- -olefin epoxide with diethanolamine onto which 4 moles EO have been added.
1.4% lactic acid (50%)

EXAMPLE 6

68.6% $C_{10}$-1.2PO-5EO
20.0% $C_{12}/C_{14}$(70:30)-2PO-5.5EO
3.0% product 1
7.0% $C_{12}$-$C_{14}$-fatty amine+12EO
1.4% lactic acid (90%)

EXAMPLE 7

79.4% $C_{10}$-2PO-7EO
10.0% $C_{12}/C_{14}$(70:30)-2PO-5.5EO
5.0% product 1
5.0% $C_{12}$-$C_{14}$(70:30)-2EO-N(EO)$_9$-H
0.6% lactic acid (90%)

TABLE 2

| Example | Cloud temperature (1%, pH 6.8) (DIN 53 914) | Immersion wetting power (DIN 53 901) | Surface tension (DIN 53 914) |
|---|---|---|---|
| 2 | 63° C. | 17 s | 27.3 mN/m |
| 3 | 69° C. | 19 s | 27.1 mN/m |
| 4 | 70° C. | 18 s | 25.9 mN/m |
| 5 | 54° C. | 16 s | 26.7 mN/m |
| 6 | 58° C. | 15 s | 25.3 mN/m |
| 7 | 70° C. | 18 s | 25.9 mN/m |

The pour point or low-temperature cloud point of all these products is at 6–7° C. and 9–10° C., respectively.

We claim:

1. A surfactant mixture which is liquid at room temperature based on polyalkoxylated alcohols of high surfactant power, characterized in that it consists of the following components, in percentages by weight based on the total weight of said mixture:

(1) from about 50 to about 84% by weight straight-chain or branched chain ether alcohol corresponding to the following general formula $$R_1-O-[PO]_{0-3}[EO]_{6-8}H \qquad (I)$$

wherein $R_1$ is a linear or branched $C_9$–$C_{11}$ alkyl group,
PO is the residue of the ring-opened propylene oxide, and
EO is the residue of the ring-opened ethylene oxide;

(2) from about 10 to about 40% by weight straight-chain or branched-chain ether alcohols corresponding to the following general formula $$R_2-O-[PO]_{0-3}[EO]_{3-6}H \qquad (II)$$

wherein $R_2$ is the linear or branched alkyl group of a fraction predominantly containing from 12 to 15 carbon atoms, and
PO and EO are residues as defined in (1);

(3) from 0 to about 10% by weight ether polyols from the reaction of ethylene oxide with polyol reactants in a molar ratio of ethylene oxide to polyol reactants of 6-15:1, the polyol reactants in turn having been produced by reaction of (a) ethylene glycol, glycerol, trimethylol propane or neopentyl glycol with
(b) $C_{12}$–$C_{18}$ α-olefin epoxides or epoxidized oleyl or linoleyl alcohol in molar ratios of (a) to (b) of from about 1:1 to about 3:1;

(4) from about 0.1 to about 10% by weight substituted amino alcohols selected from the group consisting of (A) alkyl or alkyl ether mono- or diethanolamines corresponding to the following general formulae $$R_3-[EO]_{0-4}N(CH_2CH_2OH)_2 \qquad (III)$$

$$R_3-[EO]_{0-4}N-CH_2CH_2OH \qquad (IV)$$

wherein $R_3$ is a linear or branched $C_{12}$–$C_{18}$ alkyl or alkenyl group,
EO is the residue of the ring-opened ethylene oxide, (B) the reaction product of $C_{12}$–$C_{18}$ α-olefin epoxides and mono- or diethanolamine, (C) the reaction product of epoxidized oleyl or linoleyl alcohol with mono- or diethanolamine, or (D) reaction products of the substituted amino alcohols of (A), (B) or (C) with ethylene oxide in molar ratios of from about 2 to about 12 moles ethylene oxide per mole of the substituted amino alcohol; and (5) lower carboxylic acid in such a quantity that the pH-value of a 1% by weight aqueous solution of the mixture as a whole is in the range of about 6 to about 7.5.

2. A surfactant mixture in accordance with claim 1 consisting of from about 52 to about 65% by weight of said component (1), from about 25 to about 35% by weight of said component (2), from about 3 to about 7% by weight of said component (3), from about 0.1 to about 1% by weight of said component (4) (A), (4) (B), or (4) (C), and from about 3 to about 7% by weight of said component (4) (D).

3. A surfactant mixture in accordance with claim 1 wherein said lower carboxylic acid is selected from the group consisting of acetic acid, glycolic acid, lactic acid and citric acid.

4. A surfactant mixture in accordance with claim 1 wherein said ether alcohol corresponding to general formula (II) is derived from $C_8$–$C_{18}$ alcohol fractions wherein the $C_{12}$–$C_{15}$ fraction makes up at least about 75% by weight of said alcohol fractions.

5. A surfactant mixture in accordance with claim 1 wherein said lower carboxylic acid is present therein as an amine salt.

6. A surfactant mixture in accordance with claim 1 wherein said ether alcohols containing residues of said ring-opened propylene oxide are present in said surfactant mixture.

7. A surfactant mixture in accordance with claim 1 consisting of about 58.5% by weight of a $C_{10}$ ether alcohol containing about 1.1 moles of propylene oxide and about 6.5 moles of ethylene oxide; about 11% by weight of a $C_{12}$–$C_{14}$ ether alcohol containing about 1.1 moles of propylene oxide and about 6.5 moles of ethylene oxide; about 20% by weight of a $C_{12}$–$C_{14}$ ether alcohol containing about 2 moles of propylene oxide and about 5.5 moles of ethylene oxide; about 5% by weight of the reaction product of $C_{12}$–$C_{14}$-α-olefin epoxide with ethylene glycol to which about 10 moles of ethylene oxide have been added; about 5% by weight of the reaction product of $C_{12}$-α-olefin epoxide with diethanolamine to which about 10 moles of ethylene oxide have been added; and about 0.5% by weight of lactic acid, all weights being based on the weight of said surfactant mixture.

* * * * *